(12) United States Patent
Bauernfeind et al.

(10) Patent No.: US 8,491,050 B2
(45) Date of Patent: Jul. 23, 2013

(54) FRONT-END PART OF A MOTOR VEHICLE

(75) Inventors: Christoph Bauernfeind, Bietigheim-Bissingen (DE); Ralf Hemmersmeier, Verl (DE)

(73) Assignees: Dr. Ing. h.c.F. Porsche Aktiengesellschaft (DE); HBPO GmbH (DE)

( * ) Notice: Subject to any disclaimer, the term of this patent is extended or adjusted under 35 U.S.C. 154(b) by 204 days.

(21) Appl. No.: 13/176,822

(22) Filed: Jul. 6, 2011

(65) Prior Publication Data

US 2012/0007389 A1   Jan. 12, 2012

(30) Foreign Application Priority Data

Jul. 6, 2010 (DE) .......................... 10 2010 026 298

(51) Int. Cl.
*B60J 7/00* (2006.01)
(52) U.S. Cl.
USPC .................................................... 296/193.09
(58) Field of Classification Search
USPC ............... 296/193.09, 180.1, 180.5, 193.1, 296/208; 180/903; 361/695, 697; 165/121, 165/80.3, 42, 43
See application file for complete search history.

(56) References Cited

U.S. PATENT DOCUMENTS

| 3,933,136 | A | * | 1/1976 | Burst ........................... 123/41.58 |
| 4,519,343 | A | * | 5/1985 | Hayashi et al. .............. 123/41.49 |
| 4,566,407 | A | * | 1/1986 | Peter ............................ 123/41.48 |
| 4,810,021 | A | * | 3/1989 | Burst ............................. 296/180.1 |
| 4,938,303 | A | * | 7/1990 | Schaal et al. ................. 180/68.1 |
| 5,046,550 | A | * | 9/1991 | Boll et al. ......................... 165/41 |
| 5,269,264 | A | * | 12/1993 | Weinhold ..................... 123/41.05 |
| 6,021,957 | A | * | 2/2000 | Takechi et al. ........... 237/12.3 A |
| 6,033,010 | A | * | 3/2000 | Preiss ........................... 296/180.1 |
| 6,138,749 | A | * | 10/2000 | Kawai et al. .................... 165/204 |
| 6,354,003 | B1 | * | 3/2002 | Lehmann et al. .............. 29/897.2 |
| 6,857,681 | B2 | * | 2/2005 | Nakajima ......................... 296/70 |
| 7,451,844 | B2 | * | 11/2008 | Kunikata ....................... 180/68.1 |
| 7,600,615 | B2 | * | 10/2009 | Ramsay et al. ........ 188/264 AA |
| 7,644,979 | B2 | * | 1/2010 | Bauernfeind ............ 296/193.09 |
| 7,717,204 | B2 | * | 5/2010 | Kondou et al. ............... 180/68.1 |
| 8,267,209 | B2 | * | 9/2012 | Kuwabara et al. ........... 180/68.4 |
| 8,297,685 | B2 | * | 10/2012 | Wolf et al. .................. 296/180.3 |
| 8,348,312 | B2 | * | 1/2013 | Bailey ........................... 293/115 |
| 8,365,854 | B2 | * | 2/2013 | Lee et al. ...................... 180/68.1 |

(Continued)

FOREIGN PATENT DOCUMENTS

| DE | 41 32 570 | 4/1993 |
| DE | 10 2005 051 659 | 8/2007 |
| DE | 10 2008 017 896 | 10/2009 |
| DE | 10 2008 022 554 | 11/2009 |

*Primary Examiner* — Kiran B Patel
(74) *Attorney, Agent, or Firm* — Gerald E. Hespos; Michael J. Porco; Matthew T. Hespos

(57) ABSTRACT

A front-end part of a motor vehicle has a front panel with air inlet openings in a central region and lateral regions. A central air-guiding element (14) is positioned behind a central air inlet opening in the front panel and a lateral air-guiding element (15) is positioned behind at least one lateral air inlet opening in the front panel. An air scoop (18) is arranged between the central air-guiding element (14) and at least one lateral air-guiding element (15). The air scoop (18) can be moved between a pre-installation position where the air scoop is spaced from the central air-guiding element and an installation position where the air scoop is placed against or connected to the central air-guiding element.

8 Claims, 6 Drawing Sheets

U.S. PATENT DOCUMENTS

| | | | |
|---|---|---|---|
| 2005/0230162 A1* | 10/2005 | Murayama et al. | 180/68.1 |
| 2006/0102109 A1* | 5/2006 | Becker et al. | 123/41.48 |
| 2007/0199319 A1* | 8/2007 | Bender | 60/599 |
| 2010/0147611 A1* | 6/2010 | Amano et al. | 180/68.1 |
| 2012/0012411 A1* | 1/2012 | Wolf | 180/68.1 |
| 2012/0199316 A1* | 8/2012 | Maurer et al. | 165/44 |

* cited by examiner

_US 8,491,050 B2_

FRONT-END PART OF A MOTOR VEHICLE

CROSS REFERENCE TO RELATED APPLICATION

This application claims priority under 35 USC 119 to German Patent Application No. 10 2010 026 298.6 filed on Jul. 6, 2010, the entire disclosure of which is incorporated herein by reference.

BACKGROUND OF THE INVENTION

1. Field of the Invention

The invention relates to a front-end part of a motor vehicle.

2. Description of the Related Art

DE 10 2008 017 896 A1 discloses a front-end part of a motor vehicle with a front panel that has central and lateral air inlet openings disposed respectively in central and lateral regions of the front panel. A central air-guiding element is positioned behind the central air inlet opening of the front panel and a lateral air-guiding element is positioned behind at least one of the lateral air inlet openings of the front panel. An air scoop is arranged between the central air-guiding element and at least one lateral air-guiding element. The air scoop can be transferred between a pre-installation position and an installation position. The or each air scoop of DE 10 2008 017 896 A1 is folded away from the respective lateral air-guiding element when the respective air scoop is in the pre-installation position and is held by the central air-guiding element. The respective air scoop is folded over to transfer the respective air scoop from the pre-installation position into the installation position, and, in the installation position, can be connected to the respective lateral air-guiding element.

An object of the invention is to provide a novel front-end part of a motor vehicle.

SUMMARY OF THE INVENTION

The invention relates to a front end part of a motor vehicle. The front-end part of the motor vehicle has a front panel with central and lateral air inlet openings disposed respectively in central and lateral regions of the front panel. A central air-guiding element is positioned behind the central air inlet opening of the front panel and a lateral air-guiding element is positioned behind at least one of the lateral air inlet openings of the front panel. An air scoop is arranged between the central air-guiding element and at least one lateral air-guiding element. The air scoop can be transferred between a pre-installation position and an installation position. In the pre-installation position, the or each air scoop is held on the respective lateral air-guiding element in a manner folded away from the central air-guiding element and, in the installation position, in a manner folded over to the central air-guiding element for connection to the central air-guiding element and/or placement against the central air-guiding element. More particularly, in the pre-installation position, the or each air scoop is folded away from the central air-guiding element and is held on the respective lateral air-guiding element. In the installation position, the respective air scoop is folded over to the central air-guiding element and can be connected to the central air-guiding element and/or placed against the central air guiding element.

An axis of rotation about which the respective air scoop can be transferred from the pre-installation position into the installation position and conversely from the installation position into the pre-installation position is formed between the respective lateral air-guiding element and the air scoop and not, as in the prior art, between the central air-guiding element and the respective air scoop. As a result, improved accessibility to the motor vehicle body connecting points, in particular screw connection points, located behind the air-guiding elements is provided even when a relatively large air scoop is pre-installed. Additional fastening elements, such as screws, rivets or the like, are not required.

A rear wall of the or each air scoop preferably is formed without openings and serves to transfer air between the central air-guiding element and the respective lateral air-guiding element. Owing to the fact that the rear wall of the air scoop is formed without openings, the air scoop permits an unobstructed and therefore effective transfer of air between the central air-guiding element and the respective lateral air-guiding element.

Exemplary embodiments of the invention are explained in more detail with reference to the drawing, without being restricted thereto.

DETAILED DESCRIPTION OF THE PREFERRED EMBODIMENTS

Figure 1:
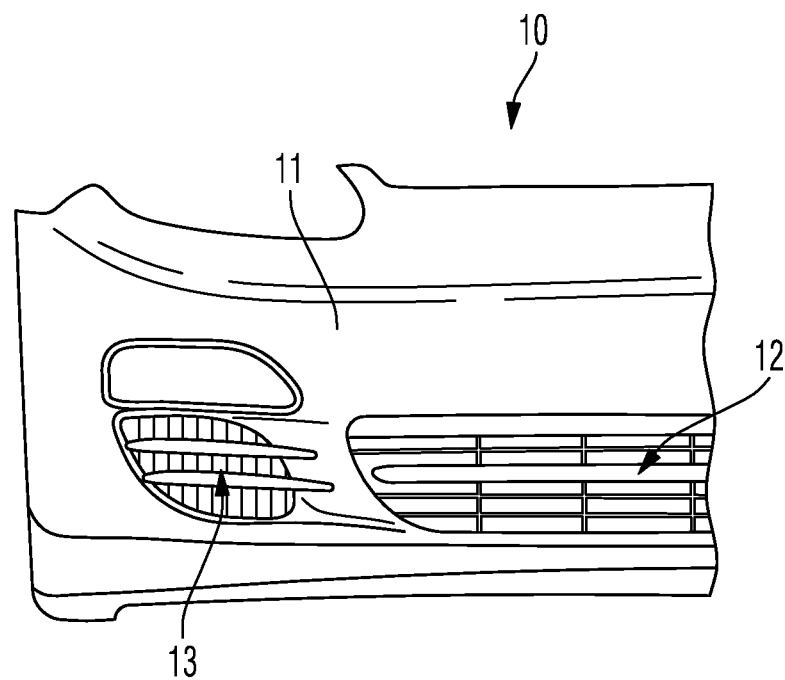
FIG. 1 is a detail from a front-end part of a motor vehicle in accordance with the invention.

A front-end part of a motor vehicle in accordance with the invention is described in detail below with reference to FIGS. 1 to 11. FIG. 1 is a front view of a detail from a front-end part 10 of a motor vehicle. The front-end part 10 has a front panel 11 with a central air inlet opening 12 in a central region of a front panel 11 and a lateral air inlet opening 13 in lateral regions laterally next to the central air-inlet opening 12.

Figure 2:
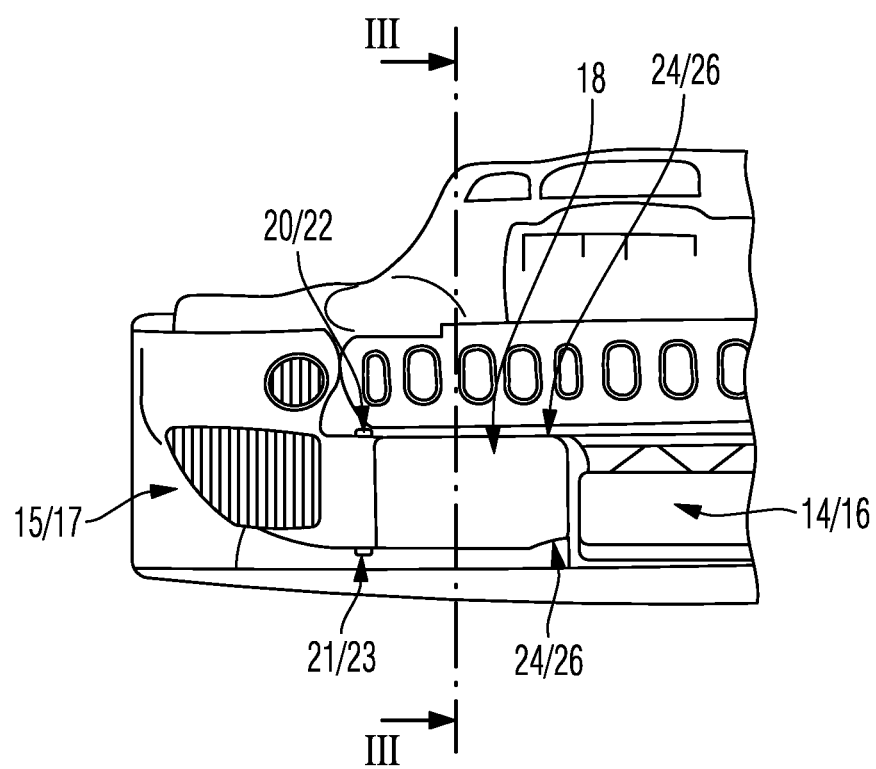
FIG. 2 is the front-end part of FIG. 1 without the front panel.
Figure 3:
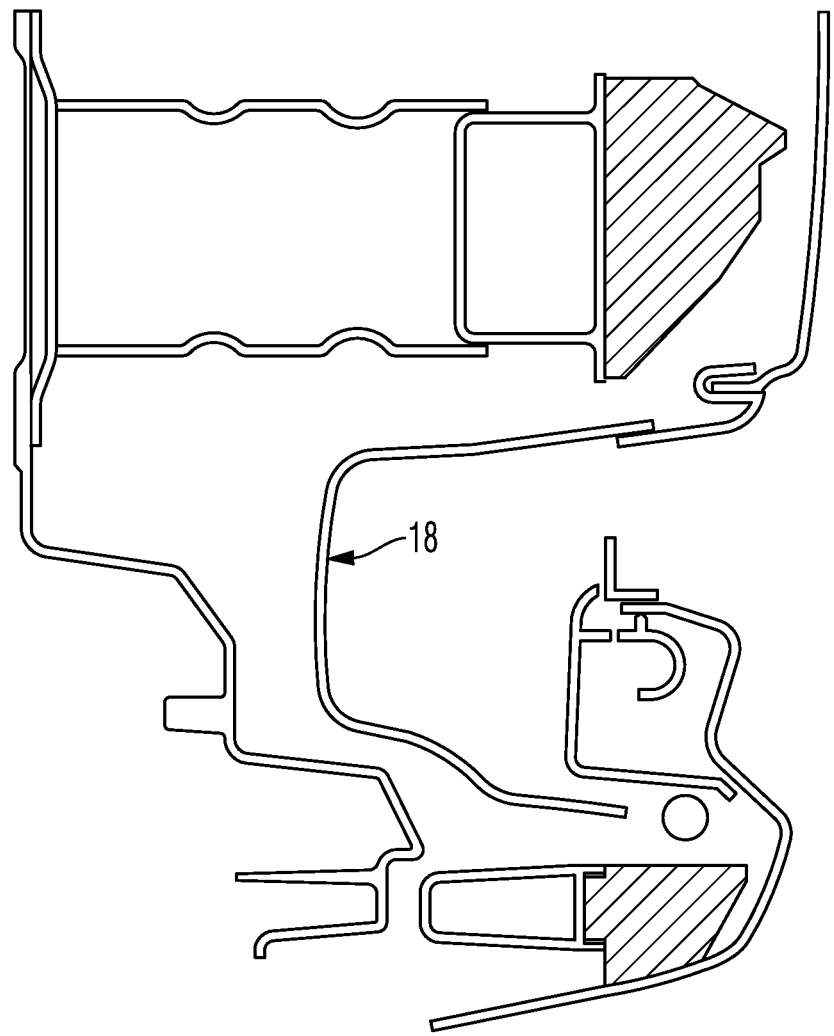
FIG. 3 is a cross section taken along line III-III of FIG. 2.

FIG. 2 is a front view of the front-end part 10 with the front panel 11 removed. FIG. 2 illustrates a central air-guiding element 14 that is positioned behind the central air inlet opening 12 of FIG. 1 and a lateral air-guiding element 15 that is positioned behind the lateral air inlet opening 13 of FIG. 1.

At least one air-guiding opening 16 is provided in the central air-guiding element 14 for supplying opening air to a central radiator arranged behind the central air-guiding element 14. At least one air-guiding opening 17 is provided in the lateral air-guiding element 15 shown in FIG. 2 and is positioned laterally next to the central air-guiding element 14 for supplying opening air to a lateral radiator arranged behind the lateral air-guiding element 15.

An air scoop 18 is arranged between the central air-guiding element 14 and the lateral air-guiding element 15, as shown in FIG. 2, and is positioned laterally next to the central air-guiding element 14. FIGS. 2 and 5 show the air scoop 18 in an installation position whereas FIG. 4 shows the air scoop 18 in a pre-installation position.

Figure 4:
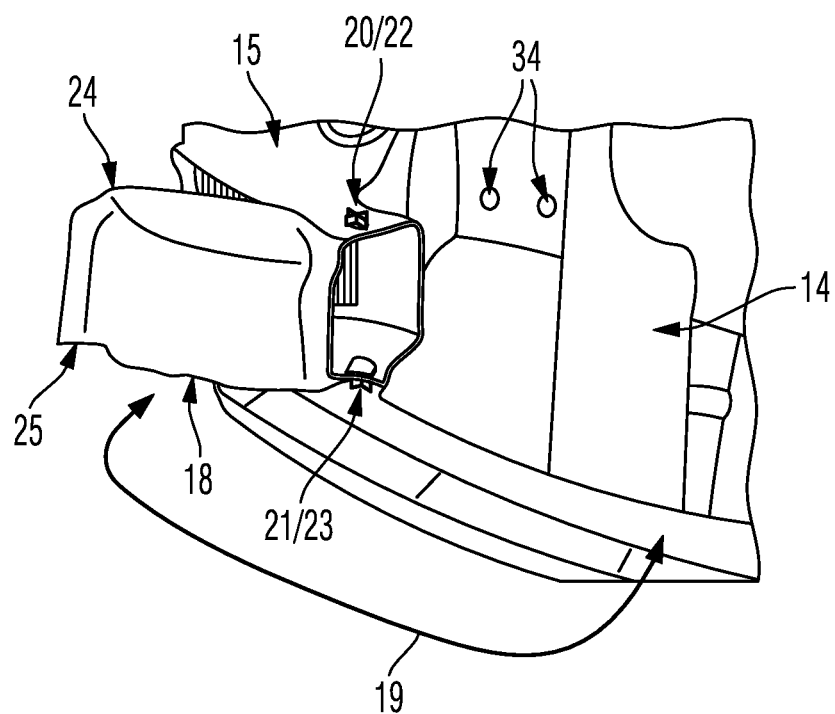
FIG. 4 is a perspective view of the front-end part of FIG. 2 with an air scoop in the pre-installation position.
Figure 5:
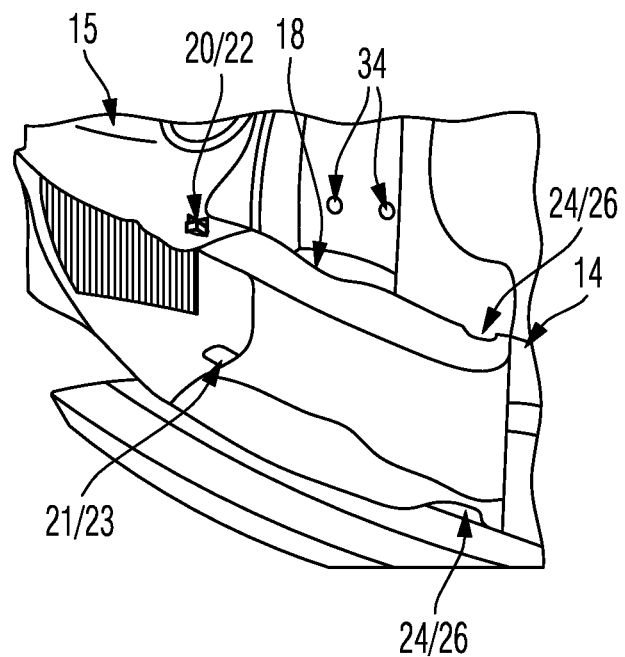
FIG. 5 is a perspective view of the front-end part of FIG. 2 with the air scoop in the installation position.

The air scoop 18, which is visible in FIGS. 2, 4 and 5, can be transferred by folding over from the pre-installation position (see FIG. 4) into the installation position (see FIGS. 2 and 5) and conversely from the installation position into the pre-installation position. The folding over of the air scoops 18 is visualized in FIG. 4 by a double arrow 19.

In the pre-installation position (see FIG. 4), the air scoop 18 visible in FIGS. 2, 4 and 5 is folded away from the central air-guiding element 14 and is held on the lateral air-guiding element 15 via connecting elements 20, 21. The connecting elements 20, 21 of the air scoop 18 preferably are "hooked pegs" that engage in corresponding openings 22, 23 in the lateral air-guiding element 15.

Figure 6:
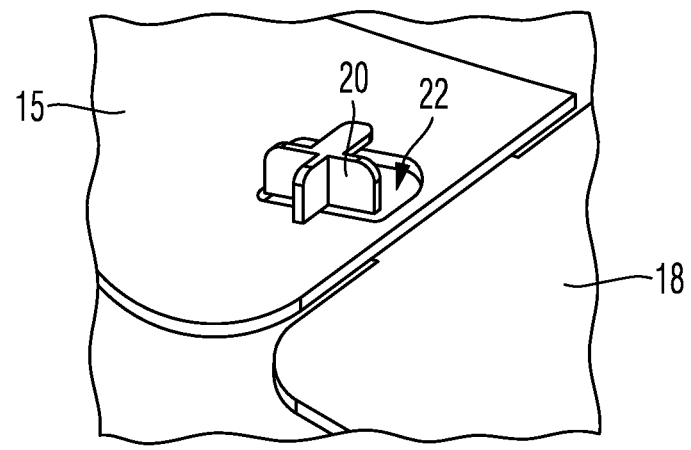
FIG. 6 shows an upper connecting element of the air scoop connecting the air scoop to a lateral air-guiding element.
Figure 7:
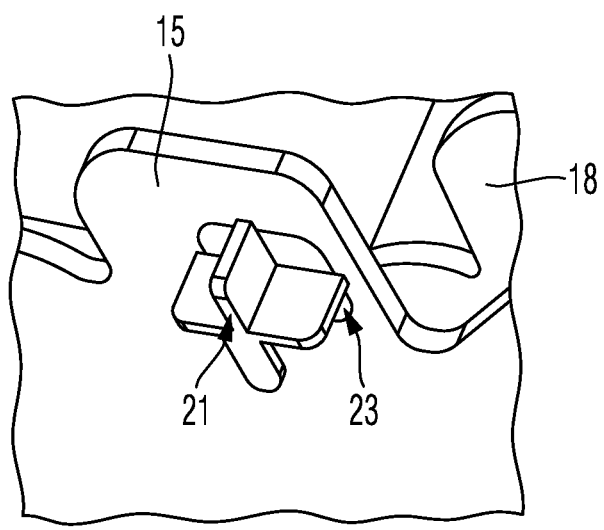
FIG. 7 shows a lower connecting element of the air scoop connecting the air scoop to the lateral air-guiding element.

FIGS. 6 and 7 show enlarged details of these connecting elements 20 and 21, that are designed as hooked pegs, and of the corresponding openings 22 and 23. The connecting element 20 together with the corresponding opening 22 forms an upper connecting point of the air scoop 18 to the lateral air-guiding element 15 and the connecting element 21 together with the opening 23 forms a lower connecting point of the air scoop 18 to the lateral air-guiding element 15.

Figure 8:
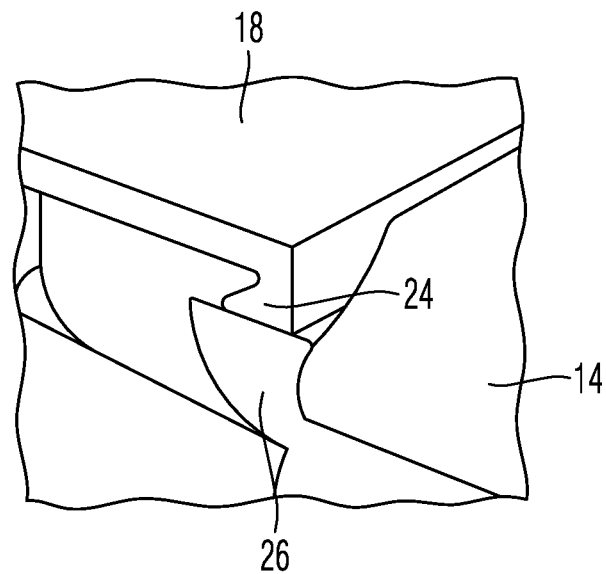
FIG. 8 shows a front connecting element of the air scoop connecting the air scoop to a central air-guiding element.

An axis of rotation about which the air scoop 18 can be rotated extends through the connecting points 20, 21, designed as hooked pegs, for transferring the air scoop 18 from the pre-installation position into the installation position. In the installation position (see FIGS. 2 and 5), the air scoop 18 is folded over to the central air-guiding element 14 and can be connected to the central air-guiding element via at least one front connecting element 24, as seen in the installation position of the air scoop 18. A front connecting element 24 of the air scoop 18 defines a projection that latches to a latching lug 26 of the central guide element 14 in the installation position, as shown in FIG. 8.

Figure 9:
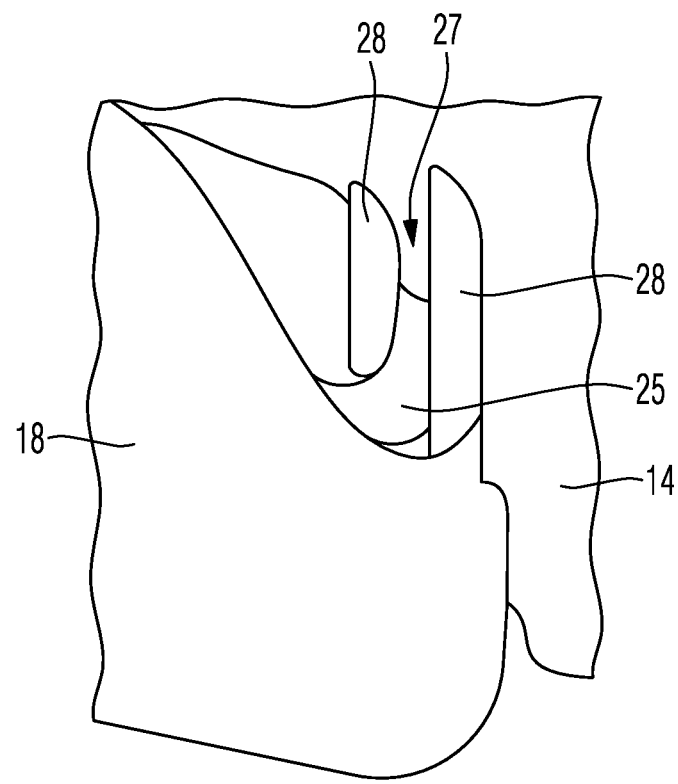
FIG. 9 shows a rear guiding element of the air scoop for support on the central air-guiding element.

The front connecting elements 24 of the air scoop 18 preferably are formed at the top and bottom of the air scoop 18 and latch to latching lugs 26 of the central guide element 14 when the air scoop 18 is in the installation position. At least one guide element 25 is formed on the air scoop 18. The guide element 25 also supports the air scoop 18 on the central air-guiding element 14 in the installation position. A rear guide element 25 of the air scoop 18 defines a projection that engages in a guide 27 of the central air-guiding element 14 in the installation position of the air scoop 18, as shown in FIG. 9. The guide 27 is defined by supporting ribs 28 of the air-guiding element 25.

The air scoop 18 preferably is to be connected or latched to the central guide element 14 in the installation position. However, it is also possible for the air scoop 18, in the installation position, to merely bear against the central guide element 14, if appropriate forming an overlap between the two components, without being connected or latched.

The axis of rotation about which the air scoop 18 can be transferred between the pre-installation position and the installation position is formed between the respective lateral air-guiding element 15 and the air scoop 18. Thus, good accessibility is provided to motor vehicle body connecting points 34, in particular screw connection points, located behind the air-guiding elements 14, 15 even when a relatively large air scoop 18 is pre-installed.

Figure 10:
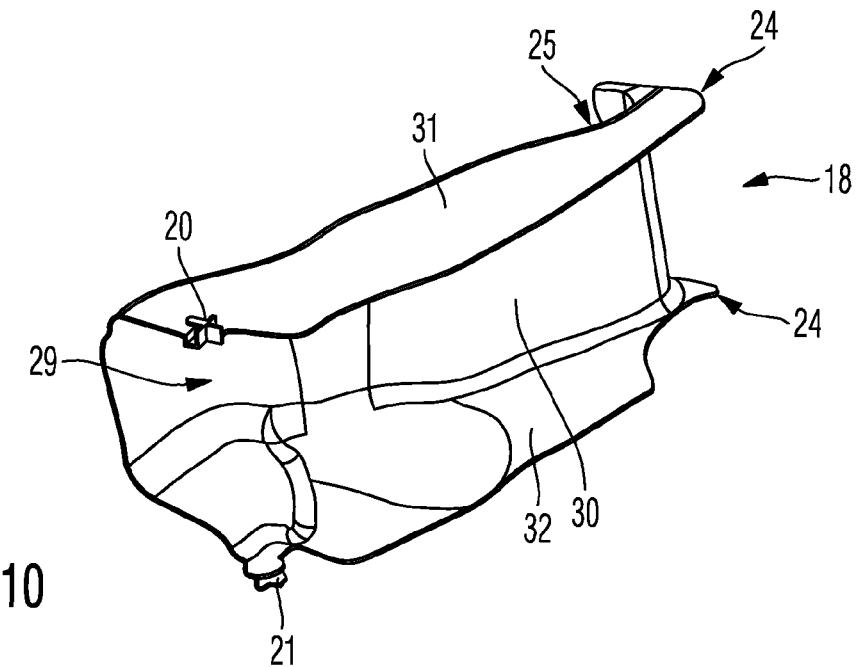
FIG. 10 is a perspective view of an air scoop.
Figure 11:
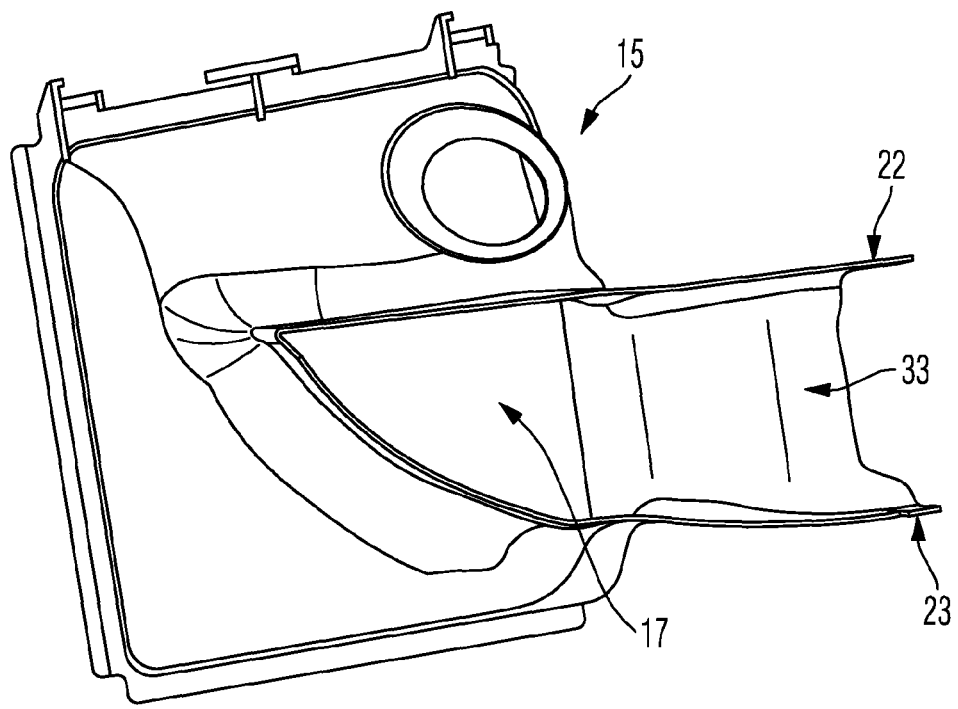
FIG. 11 is a perspective view of a lateral air-guiding element that interacts with an air scoop.

FIG. 10 is a perspective illustration of the air scoop 18 by itself. The air scoop 18 defines an air-guiding duct 29 with a rear wall 30, an upper wall 31 and a lower wall 32. Air can be transferred between the central air-guiding element 14 and the lateral air-guiding element 15 via the air-guiding duct 29.

The rear wall 30 preferably has no openings. Thus, the air scoop 18 ensures an unobstructed flow of air through the air-guiding duct 19.

In the installation position of the air scoop 18, the air-guiding duct 29 defined by the air scoop 18 complements an air-guiding duct 33 defined by the lateral air-guiding element 15 and opening into the air-guiding opening 17 in the latter.

A lateral air-guiding element 15 with an air scoop 18 arranged between the lateral air-guiding element 15 and the central air-guiding element 14 preferably is positioned exclusively behind a lateral air inlet opening 13 on one side of the central air inlet opening 12. However, this may also be the case in the region of both lateral air inlet openings 13 and therefore on both sides of the central air inlet opening 12.

What is claimed is:

1. A front-end part of a motor vehicle, comprising a front panel with a central air inlet opening and lateral air inlet openings formed respectively in a central region and lateral regions of the front panel, a central air-guiding element positioned behind the central air inlet opening in the front panel and at least one lateral air-guiding element positioned behind at least one of the lateral air inlet openings in the front panel, and at least one air scoop arranged on the lateral air-guiding element for movement between a pre-installation position where the air scoop is spaced from the central air-guiding element and an installation position where the air scoop is placed against or connected to the central air-guiding element.

2. The front-end part of claim 1, wherein at least one air-guiding opening is provided in the central air-guiding element for supplying air to parts of the motor vehicle that are behind the central air-guiding element and that require cooling.

3. The front-end part of claim 2, wherein at least one air-guiding opening is provided in the at least one lateral air-guiding element for supplying air to parts of the motor vehicle that are behind the lateral air-guiding element and that require cooling.

4. The front-end part of claim 3, wherein a rear wall of the at least one air scoop has no openings, thereby enabling an efficient transfer of air between the central air-guiding element and the respective lateral air-guiding element.

5. The front-end part of claim 1, further comprising connecting elements for holding the at least one air scoop on the respective lateral air-guiding element in the pre-installation position and in the installation position.

6. The front-end part of claim 1, further comprising at least one latch for latching the at least one air scoop to the central air-guiding element in the installation position.

7. The front-end part of claim 1, further comprising at least one guide for supporting the at least one air scoop on the central air-guiding element in the installation position.

8. The front-end part of claim 1, wherein the lateral air-guiding element and the respective air scoop arranged between the lateral air-guiding element and the central air-guiding element is positioned exclusively behind the respective lateral air inlet opening.

* * * * *